United States Patent [19]

Ota et al.

[11] Patent Number: 4,877,333

[45] Date of Patent: Oct. 31, 1989

[54] ELECTRONIC THERMOMETER

[75] Inventors: Hiroyuki Ota, Takatsuki; Isao Kai, Kameoka, both of Japan

[73] Assignee: Omron Tateisi Electronics Co., Nagaokakyo, Japan

[21] Appl. No.: 3,988

[22] Filed: Jan. 16, 1987

[30] Foreign Application Priority Data

Jan. 16, 1986 [JP]  Japan .................................. 61-7566

[51] Int. Cl.⁴ .............................................. G01K 7/00
[52] U.S. Cl. ..................................... 374/169; 128/736
[58] Field of Search .......................... 374/169; 364/557; 128/736

[56] References Cited

U.S. PATENT DOCUMENTS

| | | | |
|---|---|---|---|
| 3,877,307 | 4/1975 | Georgi | 374/169 |
| 4,068,526 | 1/1978 | Goldstein | 374/169 |
| 4,092,863 | 6/1978 | Turner | 374/169 |
| 4,629,336 | 12/1986 | Ishizaka | 374/169 |
| 4,691,713 | 9/1987 | Suzuki | 128/736 |

FOREIGN PATENT DOCUMENTS

| | | | |
|---|---|---|---|
| 0071919 | 5/1980 | Japan | 374/169 |
| 0079124 | 5/1983 | Japan | 374/169 |
| 0113826 | 7/1983 | Japan | 374/169 |
| 0225324 | 12/1983 | Japan | 374/169 |
| 0200135 | 10/1985 | Japan | 128/736 |
| 0003019 | 1/1986 | Japan | 128/736 |

OTHER PUBLICATIONS

Patent Abstracts of Japan, vol. 9, No. 207 (P-382) [1930], 24th Aug. 1985; & JP-A-60 69 525 (Casio Keisanki K.K.) 20-04-1985.
Patent Abstracts of Japan, vol. 8, No. 109 (P-275) [1546], 22nd May 1984; & JP-A-59 18 425 (Hitachi Seisakusho K.K.) 30-01-1984.
Patent Abtracts of Japan, vol. 8, No. 101 (P-273) [1538], 12th May 1984; & JP-A-59 13 928 (Hitachi Seisakusho K.K.) 24-01-1984.
Patent Abstracts of Japan, vol. 9, No. 320 (P-413) [2043], 14th Dec. 1985; & JP-A-60 147 621 (Seiko Denshi Kogyo K.K.) 03-08-1985.
Patent Abstracts of Japan, vol. 8, No. 153 (P-287) [1590], 17th Jul. 1984; & JP-A-59 51 321 (Hitachi Seisakusho K.K.) 24-03-1984.
Patent Abstracts of Japan, vol. 9, No. 161 (P-370) [1884], 5th Jul. 1985; & JP-A-60 36 926 (Tateishi Denki K.K.) 26-02-1985.
European Search Report on European Patent Application No. EP 87100544, 5/87.

Primary Examiner—William A. Cuchlinski, Jr.
Assistant Examiner—Thomas B. Will
Attorney, Agent, or Firm—Wegner & Bretschneider

[57] ABSTRACT

An electronic thermometer includes sensing member for sensing a temperature to be taken thereby, storage member for storing the sensed temperature from the sensing member, judging member for judging whether the change of the sensed temperature is a predetermined change, predicting member for predicting a steady temperature based on the sensed temperature when the judging member produces the judge of the predetermined change, and displaying member for displaying the sensed temperature or the steady temperature predicted by the predicting member.

5 Claims, 4 Drawing Sheets

ELECTRONIC THERMOMETER

BRIEF SUMMARY OF THE INVENTION

This invention relates to an electronic thermometer which displays a body temperature value by employing a temperature sensor, and more particularly to an improved thermometer which predicts a converged or steady temperature value corresponding to a body temperature to be taken according to a measured temperature.

A conventional electronic clinical thermometer is so designed that a body temperature is sensed by a sensor disposed on a tapered end of a probe and a detection signal representing the sensed temperature from the sensor is processed by a signal processing circuit, such as CPU or the like, to display the sensed temperature on a display. The sensed temperature by the sensor does not reach the body temperature when one starts to take his body temperature, but in a predetermined time period reaches the temperature. For example, if the sensor is set in position under the arm for a few minutes, the sensed temperature by the sensor is converged to the body temperature. Accordingly there has been proposed an electronic clinical thermometer in which a steady temperature where the sensed temperature reaches the body temperature is predicted by the change of the sensed temperature and the predicted steady or converged temperature is sequentially renewed to be displayed to shorten the measuring time. This prediction is made in any temperature measurement including improper measurement. Accordingly the conventional electronic clinical thermometer has the disadvantages that even hot water is regarded as a body temperature to predict the steady temperature value by computing the change of the sensed temperature to display the value. Even if the predicting expression produces an unfavorable error due to unusual constitution of the body to be measured, the predicted temperature value is computed to be displayed based on a sensed temperature, so that the accuracy of the predicted value is reduced.

It is therefore a general object of this invention to overcome the above-mentioned disadvantages of the conventional electronic clinical thermometer and to provide an improved electronic thermometer with high accuracy which produces a prediction operation measurement only when one takes the body temperature.

It is a further object of this invention to provide an electronic thermometer which may be used as a normal thermometer to measure other temperature, such as hot water, other than the body temperature without producing such a predicting operation measurement.

According to this invention, there is provided an electronic thermometer comprising sensing means for sensing a temperature to be taken thereby, storage means for storing the sensed temperature from the sensing means, judging means for judging whether the change of the sensed temperature is a predetermined change, predicting means for predicting a converged or steady temperature based on the sensed temperature when the judging means produces the judge of the predetermined change, and displaying means for displaying the sensed temperature or the steady temperature predicted by the predicting means.

Other objects and advantages of this invention will be apparent to those skilled in the art from the following description of the preferred embodiment in conjunction with the appended drawings.

DETAILED DESCRIPTION

Figure 1:
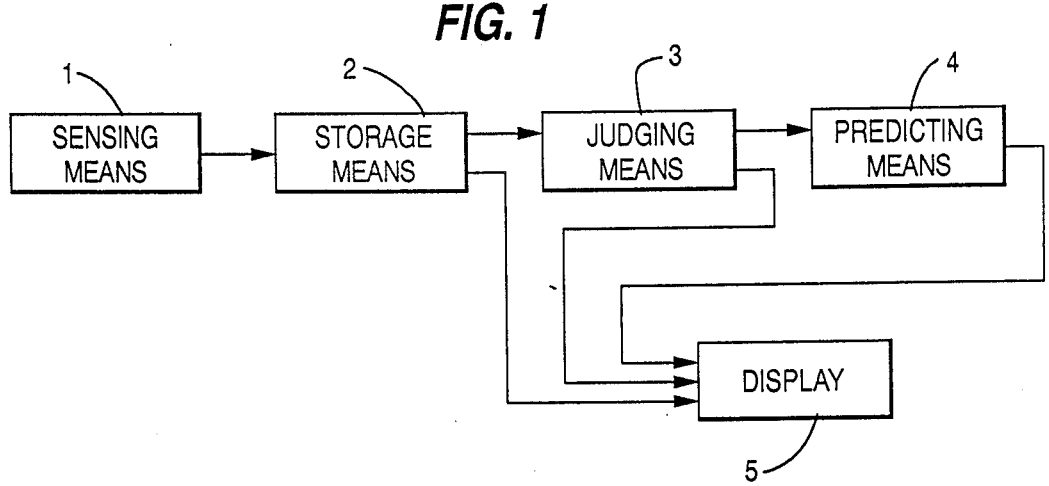
FIG. 1 shows a basic construction of an electronic thermometer as a preferred embodiment of this invention.

Referring, now, to FIG. 1, there is shown a basic construction of an electronic thermometer as a preferred embodiment of this invention. The thermometer includes sensing means 1 for sensing a temperature to be taken, storage means 2 for storing the sensed temperature by the sensing means, judging means 3 for judging whether the change of the sensed temperature is a predetermined change representing a body temperature, predicting means 4 for predicting a converged or steady temperature according to the sensed temperature when the judge by the judging means shows the predetermined change, and display means 5 for displaying the sensed temperature or the predicted steady temperature.

Figure 2:
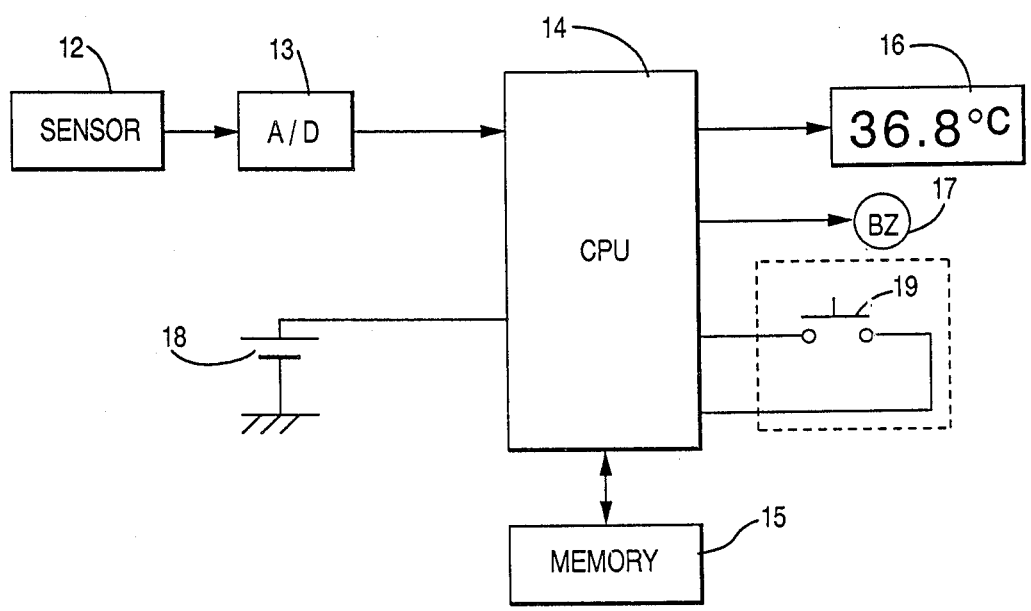
FIG. 2 is a schematic block diagram of an electronic clinical thermometer employed in the thermometer of FIG. 1.

FIG. 2 shows an electronic thermometer representing the thermometer of FIG. 1 in more detail. The sensing means 1 is represented by a temperature sensor 12, the storage means 2 by a memory 15, the judging means 3 and the predicting means 4 by CPU 14, and the display means 5 by a display 16.

The temperature sensor 12 is employed by a temperature-resistance transducer such as a thermister or the like, and adapted to sense a body temperature to be converted to a digital signal by an A/D converter 13 for application to CPU 14. The CPU 14 reads the digital signal representing the sensed temperature at a predetermined sampling timing to be applied to the memory 15 to be stored therein and to the display 16 to display the sensed temperature.

Figure 3:
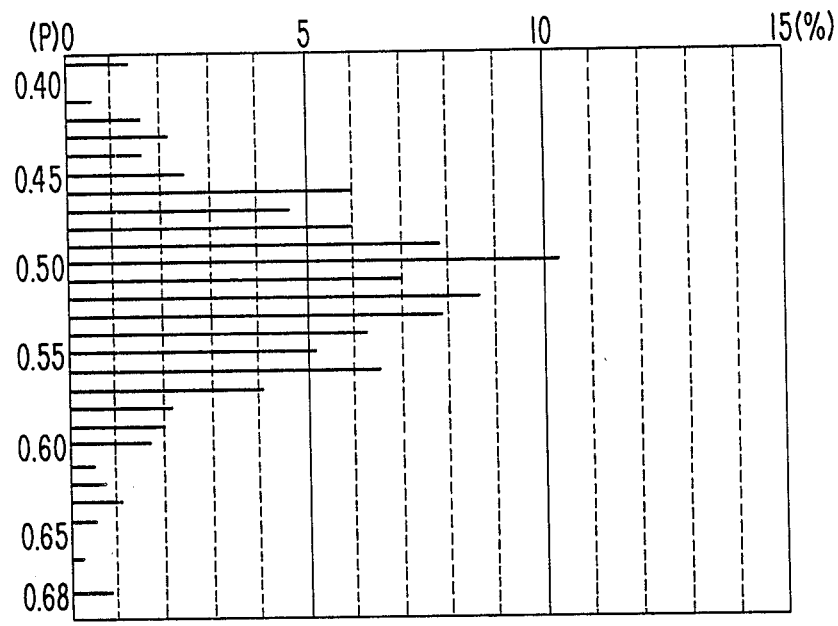
FIG. 3 is a graph representing clinical data concerning parameter P.
Figure 4:
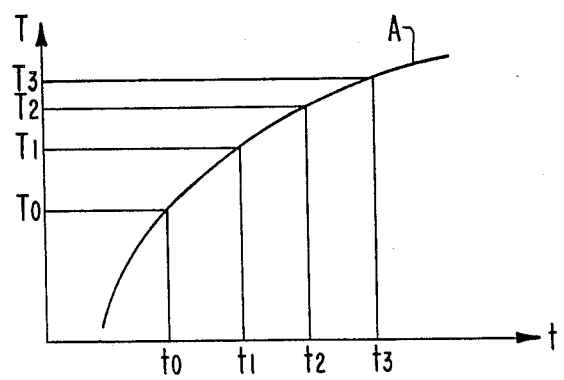
FIG. 4 shows a response curve representing sensed temperature upon time elapsing.

The judging means 3 employed by CPU 14 for judging whether the change of the sensed temperature with respect to time elapse is the change of the body temperature or not is performed by computing a parameter P by analyzing a response curve of the change of the sensed temperature and judging whether the computed parameter exists within a predetermined range of set values. The set values are defined by the clinical experimental data shown in FIG. 3 which shows 368 clinical data by parameter P on ordinate and occurrence percentage on abscissa. 99% of the data have the parameters between 0.48 and 0.68, whereby the computed parameter having its value between 0.48 and 0.68 is judged that a body temperature is taken. This parameter P is computed out by ratio of differential of the response curve A as illustrated in FIG. 4 where the ordinate represents the sensed temperature T and the abscissa represents the elapsing time t, and given by the following equation (1):

$$P = \frac{(T_2 - T_1)/(t_2 - t_1)}{(T_1 - T_0)/(t_1 - t_0)} \quad (1)$$

P is judged whether it exists within the range between 0.48 and 0.68.

Alternatively this parameter P may be given by the following equation:

(a) the ratio of the change of the differential:

$$P = \frac{(T_3 - T_2)/(t_3 - t_2) - (T_2 - T_1)/(t_2 - t_1)}{(T_2 - T_1)/(t_2 - t_1) - (T_1 - T_0)/(t_1 - t_0)}$$

or (b) the change of the ratio of the differential:

$$P = \frac{(T_3 - T_2)/(t_3 - t_2)}{(T_2 - T_1)/(t_2 - t_1)} - \frac{(T_2 - T_1)/(t_2 - t_1)}{(T_1 - T_0)/(t_1 - t_0)}$$

or (c) the ratio of the ratio of the differential:

$$P = \frac{(T_3 - T_2)/(t_3 - t_2)}{(T_2 - T_1)/(t_2 - t_1)} - \frac{(T_2 - T_1)/(t_2 - t_1)}{(T_1 - T_0)/(t_1 - t_0)}$$

The parameter P produced by the above-mentioned equations may be further judged to be within a predetermined range in combination, if desired.

The above-mentioned predicting means 4 is activated only when the judging means 3 judges the measurement to take the body temperature, so that a steady temperature is predicted based on the differential of the sensed temperature or a grade of a response curve and the predicted steady temperature is displayed on display 16 employing a liquid crystal display. A buzzer 17 is disposed to inform one taking the body temperature that the predicted value reaches a steady state. The thermometer of this embodiment is further provided with a power source 18 and a power switch 19 associated with CPU 14.

Figure 5:
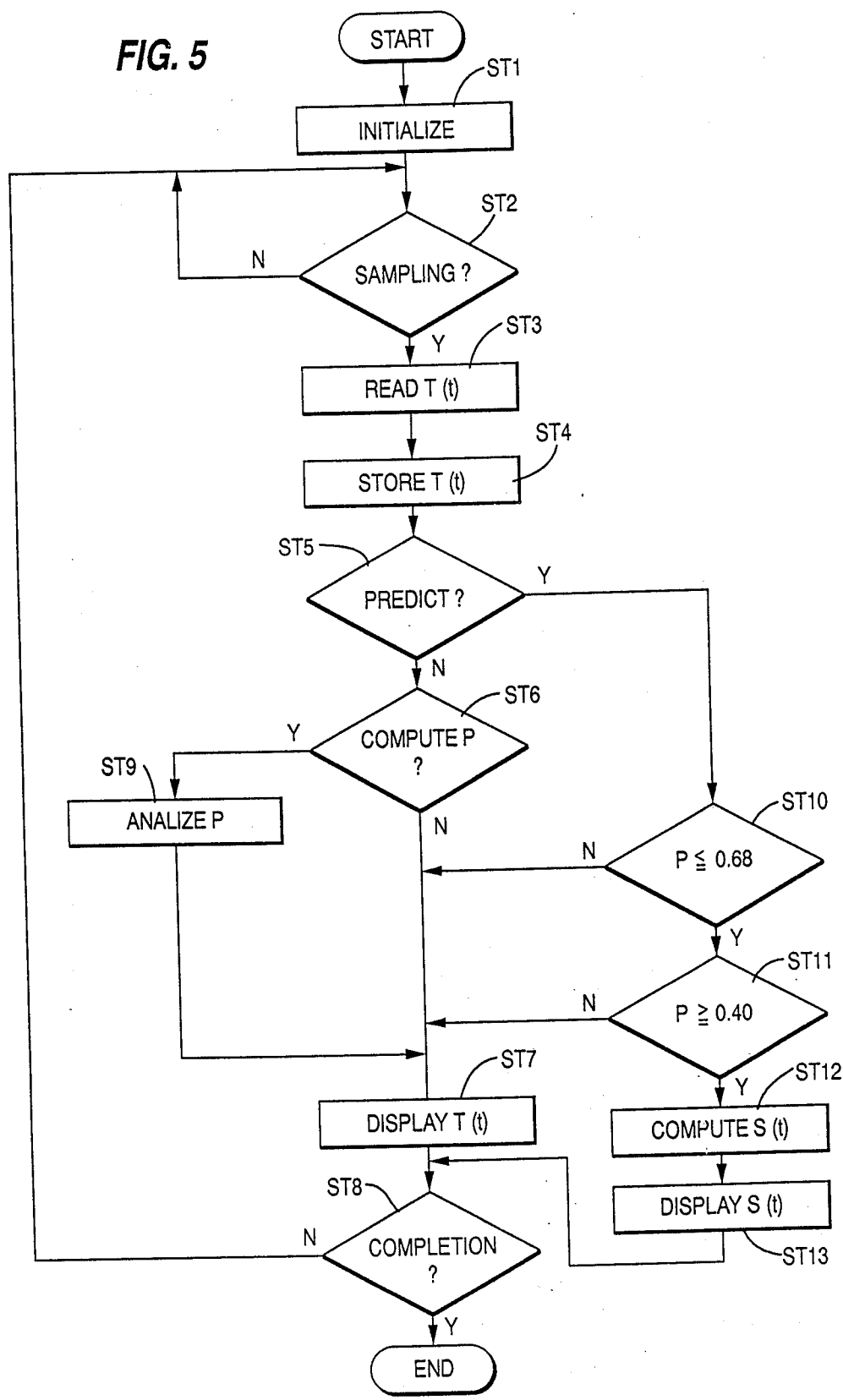
FIG. 5 is a control flow chart employed in the thermometer of FIG. 2.

The construction and the measuring operation will be described hereinafter in conjunction with a flow chart in FIG. 5.

Upon turning on the power switch 19 to initiate taking a body temperature, all operations are initialized in a step ST1 and it is inquired in a step ST2 whether a sampling time comes. When the sampling time comes, the sequence flows to a step ST3 to read a sensed temperature T at the temperature sensor 12 into CPU 14 and to a step ST4 to store the temperature T in the memory 15. At each sampling time the subsequent operation from step ST5 to step ST8 is performed to return to the step ST2, thus this sampling being repeated every one second.

Turning to step ST5, it is inquired whether the predicting can predict or not. If 40 seconds has passed, viz. t>40, the step ST5 produces a Yes response representing that predictable data (sensed temperature T) are obtained. If the prediction is impossible, viz. t≦40, a No response is produced for application to step ST6 where it is inquired if there may be computed the parameter P to judge whether a body temperature is taken or not. Unless 40 seconds or longer time has elapsed from start, the parameter P cannot be computed, viz. sufficient sensed temperature T to compute out the parameter P is not obtained, so that the sequence flows from ST6 to ST7 to display the sensed temperature on display 16. Until completion of taking the body temperature, the sequence returns to the step ST2 through a step ST8.

The operations from ST2 to ST8 are performed for 40 seconds from start. When the 40 seconds passed, the parameter P may be computed and a Yes response from ST6 is applied to a step ST9 where the parameter P is computed by analyzing the response curve. As exemplarily shown in FIG. 6 and FIG. 7, the response curves B and C of the sensed temperature T with respect to time t are analyzed and the parameters P are computed by the above-mentioned equation (1). For example, in 10 second intervals, viz. $t_0=20$, $t_1=30$ and $t_2=40$, the corresponding temperatures $T_0$, $T_1$ and $T_2$ may be applied to the equation (1). Its modified equation provides the parameter P as follows:

$$P = (T_2 - T_1)/(T_1 - T_0)$$

Then, the sequence flows from ST9 to ST7.

Figure 7:
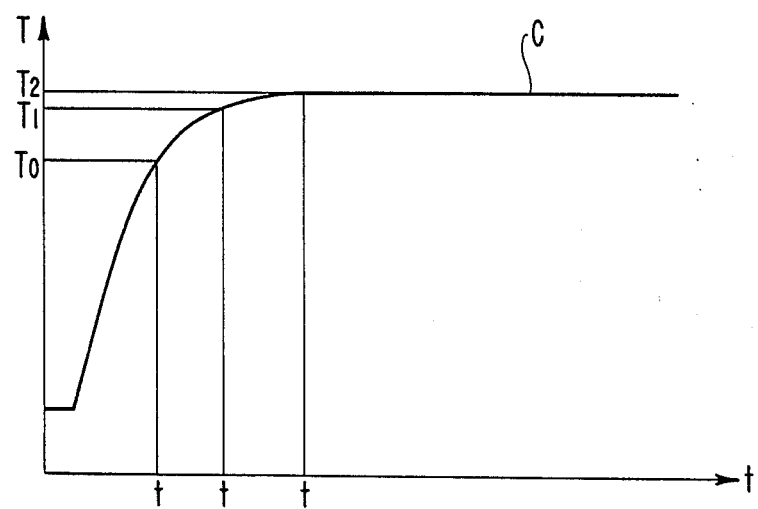
FIG. 7 is a response curve on taking a temperature of improper substance.

At subsequent sampling time, a Yes response representing that the prediction is possible since 40 seconds lapsed is produced from step ST5 to steps ST10 and ST11 where whether the computed parameter exists within a predetermined range is inquired (judging means 3). In view of the clinical data shown in FIG. 3, it is inquired whether the parameter is below 0.68 or above 0.40. The status P>0.68 shows rapid temperature rising other than taking a body temperature, and the status P<0.40 shows slow temperature rising, either showing other than taking a body temperature or improper measurement having change out of range. Accordingly, if the change of the response curve C is small as shown in FIG. 7, a No response is produced from the step ST11 for application to step ST7, so that the sensed temperature T remains to be displayed on display 16 as it is without predicting any steady temperature. In the rapid temperature rising the step ST10 produces a No response to continue to display the sensed temperature.

Figure 6:
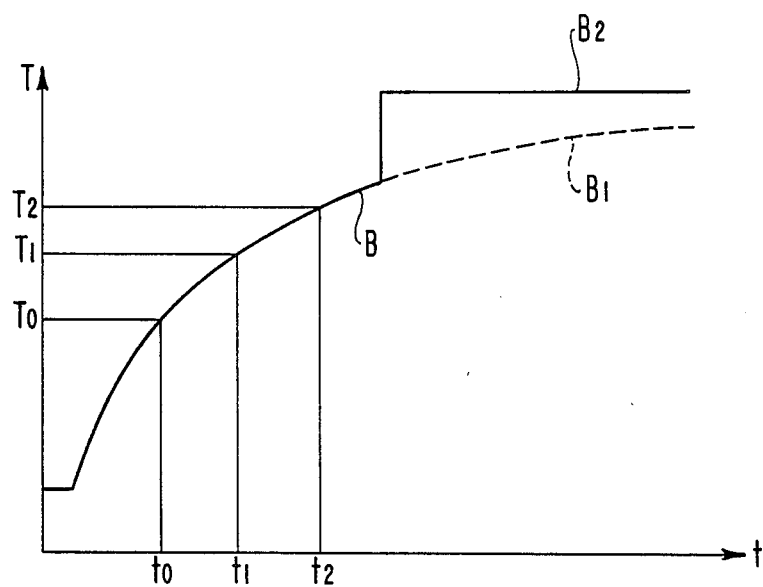
FIG. 6 is a response curve on taking a body temperature.

If the computed parameter P exists within the predetermined range as shown in FIG. 6, the steps ST10 and ST11 produce Yes responses respectively, so that a predetermined taking body temperature is affirmed and the sequence flows to a step ST12 to compute out a predicted value S(t). Thus, the predicting means 4 is performed. This prediction is performed in view of the change of the sensed temperature T, and the predicted value S(t) is displayed on the display 16 instead of the sensed temperature T (step ST13), viz. in FIG. 6 a solid line $B_2$ is displayed instead of a broken line $B_1$. Then, the sequence flows from ST13 to ST8.

If this predicted value S(t) is fixed to a certain extent, the buzzer 17 is actuated (ST8) and the power switch 19 is turned off to finish all measuring operations.

Thus, according to this embodiment, there is provided an electronic thermometer in which the change of the sensed temperature is determined to be a predetermined change, viz. the change of a taken body temperature, or not and a steady temperature is predicted only in the case of the predetermined change, so that improper measurement other than taking the body temperature does not produce prediction and the sensed temperature is displayed continuously, whereby only precise prediction is obtained. Any other measurement, such as taking a temperature of hot water, also may be performed by this thermometer since the sensed temperature is displayed as it is. Moreover, in case that the setting method of the thermometer is improper or the body to be measured is diathesis, any prediction is not produced and actual sensed temperature is displayed, so that the accuracy of the predicted temperature value is improved.

While the invention has been particularly shown and described in reference to preferred embodiments thereof, it will be understood by those skilled in the art that changes in form and details may be made therein without departing from the spirit and scope of the invention.

What is claimed is:

1. An electronic thermometer, comprising:
    sensing means for sensing a temperature to be taken by the thermometer;
    storage means for storing said sensed temperature from said sensing means;
    judging means for judging whether said sensed temperature is changing within a predetermined range of change;
    predicting means for predicting a steady temperature based on said sensed temperature, wherein the operation of the predicting means is conditioned on said judging means judging that said sensed temperature is changing within the predetermined range of change; and
    displaying means for displaying said sensed temperature or said steady temperature predicted by said predicting means.

2. An electronic thermometer according to claim 1, wherein said sensed temperature is displayed on said display means as long as said predicted steady temperature is not produced by said predicting means.

3. An electronic thermometer according to claim 1, wherein said predetermined change represents that said sensed temperature is obtained by taking a body temperature.

4. An electronic thermometer according to claim 1, wherein the judging means judges whether the change of said sensed temperature is outside said predetermined range of change.

5. An electronic thermometer according to claim 1, wherein the judging means judges whether the change of said sensed temperature is outside said predetermined range of change which indicates that the sensed temperature is obtained from other than body temperature.

* * * * *